US011586338B2

(12) United States Patent
Pitman (10) Patent No.: US 11,586,338 B2
(45) Date of Patent: Feb. 21, 2023

(54) SYSTEMS AND METHODS FOR ANIMATED COMPUTER GENERATED DISPLAY

(71) Applicant: OPEN TEXT SA ULC, Halifax (CA)

(72) Inventor: Jonathon Pitman, Waterloo (CA)

(73) Assignee: Open Text SA ULC, Halifax (CA)

(*) Notice: Subject to any disclaimer, the term of this patent is extended or adjusted under 35 U.S.C. 154(b) by 0 days.

(21) Appl. No.: 15/946,134

(22) Filed: Apr. 5, 2018

(65) Prior Publication Data

US 2018/0292975 A1    Oct. 11, 2018

Related U.S. Application Data

(63) Continuation-in-part of application No. 29/599,635, filed on Apr. 5, 2017, now Pat. No. Des. 868,834.

(60) Provisional application No. 62/524,917, filed on Jun. 26, 2017.

(51) Int. Cl.
*G06F 3/04817* (2022.01)
*G06F 3/04842* (2022.01)
*G06F 3/0482* (2013.01)
*G06F 3/04812* (2022.01)

(52) U.S. Cl.
CPC ........ *G06F 3/04817* (2013.01); *G06F 3/0482* (2013.01); *G06F 3/04812* (2013.01); *G06F 3/04842* (2013.01)

(58) Field of Classification Search
CPC ............. G06F 3/04817; G06F 3/04812; G06F 3/0482; G06F 3/04842
USPC ........................................................ 715/840
See application file for complete search history.

(56) References Cited

U.S. PATENT DOCUMENTS

| | | | |
|---|---|---|---|
| 5,689,669 A | 11/1997 | Lynch et al. | |
| 6,049,336 A * | 4/2000 | Liu | G06F 3/0482 715/830 |
| 6,396,520 B1 * | 5/2002 | Ording | G06F 3/0481 715/781 |
| D491,956 S | 6/2004 | Ombao et al. | |
| D499,740 S | 12/2004 | Ombao et al. | |
| 6,847,387 B2 * | 1/2005 | Roth | G06F 3/0482 715/738 |
| 7,502,785 B2 | 3/2009 | Chen et al. | |

(Continued)

OTHER PUBLICATIONS

How to Morph Shapes—After Effects Tutorial (https://www.youtube.com/watch?v=iLd-5x5KhyA) (Year: 2015).*

(Continued)

*Primary Examiner* — Sherief Badawi
*Assistant Examiner* — Koorosh Nehchiri
(74) *Attorney, Agent, or Firm* — Sprinkle IP Law Group (57) ABSTRACT

Responsive to user interacting with a selectable object on a user interface, the selectable object is transitioned in an animated transitioning process into a dialog menu with selectable options. The animated transitioning process can include rotating a part of the selectable object (e.g., rotating a "+" symbol into an "x" symbol), changing a function of the part of the selectable object being rotated (e.g., from "Add" to "Close"), and changing the shape and/or size of the selectable object. As part of the animated transitioning process, dialog menu items may be displayed in the dialog menu. Once the animated transitioning process is complete, the user can interact with the dialog menu. Closing the dialog menu triggers an animated transitioning process that transitions the dialog menu to a selectable object.

20 Claims, 9 Drawing Sheets

(56) References Cited

U.S. PATENT DOCUMENTS

| | | | |
|---|---|---|---|
| 7,590,947 B1* | 9/2009 | Gay | G06F 3/0483 |
| | | | 715/798 |
| D638,026 S | 5/2011 | Rechin et al. | |
| D640,269 S | 6/2011 | Chen | |
| D643,044 S | 8/2011 | Ording | |
| D659,706 S | 5/2012 | David et al. | |
| D663,744 S | 7/2012 | Tanghe et al. | |
| D689,876 S | 9/2013 | Holz | |
| D699,740 S | 2/2014 | Woo | |
| D703,692 S | 4/2014 | Phelan | |
| D705,812 S | 5/2014 | Gerssen et al. | |
| 8,904,287 B2* | 12/2014 | Kumar | G06F 3/0482 |
| | | | 715/711 |
| D727,936 S | 4/2015 | Prajapati et al. | |
| D728,593 S | 5/2015 | Prajapati et al. | |
| D728,594 S | 5/2015 | Myette et al. | |
| D738,391 S | 9/2015 | Everingham et al. | |
| D738,900 S* | 9/2015 | Drozd | D14/486 |
| D749,088 S | 2/2016 | Liu | |
| D751,599 S* | 3/2016 | Connolly | D14/488 |
| D754,692 S | 4/2016 | Hurst et al. | |
| D761,840 S* | 7/2016 | Patterson | D14/488 |
| D765,674 S* | 9/2016 | Kim | D14/485 |
| 9,436,357 B2* | 9/2016 | Pallakoff | G06F 3/0483 |
| 9,448,692 B1* | 9/2016 | Mierau | G06F 3/04817 |
| D769,922 S | 10/2016 | Hally et al. | |
| D769,923 S | 10/2016 | Hally et al. | |
| D772,268 S | 11/2016 | Hally et al. | |
| D775,633 S* | 1/2017 | Wu | D14/485 |
| D781,901 S | 3/2017 | Gandhi et al. | |
| D785,652 S | 5/2017 | Hally et al. | |
| D795,294 S | 8/2017 | Faulkner et al. | |
| D807,387 S* | 1/2018 | Cho | D14/486 |
| D814,511 S | 4/2018 | Henderson et al. | |
| D817,998 S* | 5/2018 | Lee | G06F 3/04883 |
| | | | D14/488 |
| D819,684 S | 6/2018 | Dart | |
| D828,375 S | 9/2018 | Mok et al. | |
| 10,074,381 B1* | 9/2018 | Cowburn | G06F 40/58 |
| D829,762 S | 10/2018 | Kwak et al. | |
| D839,294 S | 1/2019 | Mazlish et al. | |
| D843,399 S | 3/2019 | Park et al. | |
| D845,318 S | 4/2019 | Malik et al. | |
| D868,834 S | 12/2019 | Pitman | |
| 2002/0122072 A1* | 9/2002 | Selker | G06F 3/0482 |
| | | | 715/834 |
| 2005/0216568 A1* | 9/2005 | Walkush | G06Q 10/107 |
| | | | 709/207 |
| 2006/0146055 A1* | 7/2006 | Chow | G09G 5/363 |
| | | | 345/473 |
| 2007/0094597 A1* | 4/2007 | Rostom | G06F 3/0482 |
| | | | 715/700 |
| 2007/0168060 A1* | 7/2007 | Nixon | G06F 9/4488 |
| | | | 700/83 |
| 2007/0288862 A1* | 12/2007 | Ording | G06F 3/0481 |
| | | | 715/788 |
| 2009/0132907 A1* | 5/2009 | Shao | G06F 17/2247 |
| | | | 715/234 |
| 2009/0183100 A1* | 7/2009 | Eom | G06F 3/0482 |
| | | | 715/769 |
| 2011/0055760 A1* | 3/2011 | Drayton | G06F 3/0482 |
| | | | 715/834 |
| 2011/0066981 A1* | 3/2011 | Chmielewski | G06F 3/0482 |
| | | | 715/834 |
| 2011/0087977 A1* | 4/2011 | Campney | G05B 19/0426 |
| | | | 715/763 |
| 2011/0164053 A1* | 7/2011 | Nakamura | G01C 21/3664 |
| | | | 345/629 |
| 2012/0036434 A1* | 2/2012 | Oberstein | G06F 3/0482 |
| | | | 715/702 |
| 2012/0054355 A1 | 3/2012 | Arrasvuori et al. | |
| 2012/0306788 A1* | 12/2012 | Chen | G06F 3/0482 |
| | | | 345/173 |
| 2013/0019173 A1* | 1/2013 | Kotler | G06F 3/04883 |
| | | | 715/711 |
| 2014/0033128 A1* | 1/2014 | Patterson | G06F 17/2235 |
| | | | 715/834 |
| 2015/0062052 A1* | 3/2015 | Bernstein | G06F 3/0482 |
| | | | 345/173 |
| 2015/0205455 A1* | 7/2015 | Shaw | G06F 3/0482 |
| | | | 715/834 |
| 2015/0370444 A1* | 12/2015 | Jitkoff | G09G 5/377 |
| | | | 715/823 |
| 2016/0259495 A1* | 9/2016 | Butcher | G06F 3/04883 |
| 2017/0293592 A1* | 10/2017 | He | G06F 40/106 |
| 2018/0275762 A1* | 9/2018 | Freeman | G06F 3/017 |

OTHER PUBLICATIONS

After Effects CC 2018—Particle Logo Animation (https://www.youtube.com/watch?v=aYb_2S8q1FE&list=RDCMUC6SWCKmOGEUp82OdTV9fQkw&start_radio=1) (Year: 2018).*

Object Warping in Adobe Illustrator (https://www.youtube.com/watch?v=zXat-Khmi8Y) (Year: 2016).*

Vector graphics—Wikipedia (https://en.wikipedia.org/wiki/Vector_graphics) (Year: 1993).*

Notice of Allowance issued for U.S. Appl. No. 29/599,635, dated Jul. 23, 2019, 8 pages.

* cited by examiner

SYSTEMS AND METHODS FOR ANIMATED COMPUTER GENERATED DISPLAY

CROSS-REFERENCE TO RELATED APPLICATIONS

This application claims a benefit of priority under 35 U.S.C. § 120 from U.S. patent application Ser. No. 29/599,635, filed Apr. 5, 2017, issued as U.S. Pat. 29/599,635, entitled "DISPLAY SCREEN OR PORTION THEREOF WITH ANIMATED COMPUTER GENERATED MENU." This application also claims a benefit of priority under 35 U.S.C. § 119(e) from U.S. Provisional Application No. 62/524,917, filed Jun. 26, 2017, entitled "SYSTEMS AND METHODS FOR ANIMATED COMPUTER GENERATED DISPLAY." Both applications are incorporated by reference herein in their entireties.

TECHNICAL FIELD

This disclosure relates generally to the field of computer displays. More particularly, this disclosure relates to the field of screens with graphical user interfaces.

BACKGROUND OF THE RELATED ART

Many interactions on electronic devices such as mobile devices and desktop devices may result in the displaying of a dialog with user-actionable user interface elements.

SUMMARY OF THE DISCLOSURE

Embodiments disclosed herein provide technical solutions and benefits in user-actionable user interface elements. One example aspect of the invention is to provide an animated computer-generated dialog. For example, a first selectable object associated with a first function, may be transformed, via an animated display, to a second selectable object associated with a second function.

Embodiments disclosed herein provide a new system, method, and computer program product for an animated computer-generated dialog.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
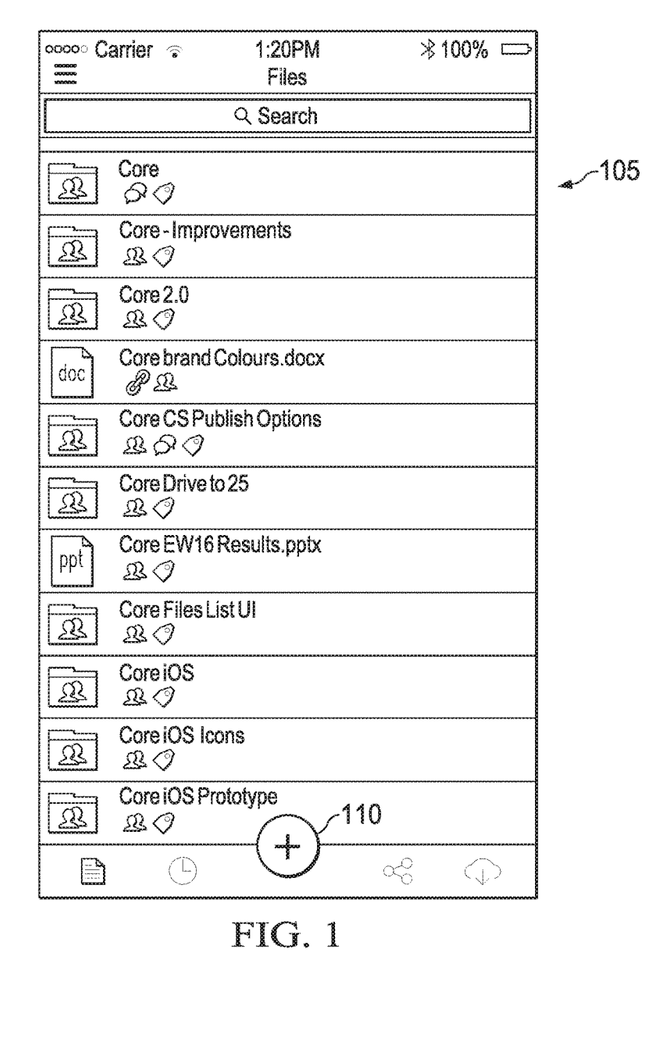
FIG. 1 depicts a display of a user interface showing a selectable object according to some embodiments.

FIG. 1 depicts a display of an example user interface (UI) showing a selectable object according to some embodiments.

In the example shown in FIG. 1, a display 105 may display a selectable object 110 (which is an example of a user-actionable user interface element). The selectable object may be displayed anywhere in the display 105, although FIG. 1 shows that the selectable object 110 is displayed in the center of the bottom of the display 105. In the example shown in FIG. 1, the selectable object 110 may include a selectable button with an "Add" symbol (e.g., a "+" symbol) in the center of the selectable button.

Figure 2:
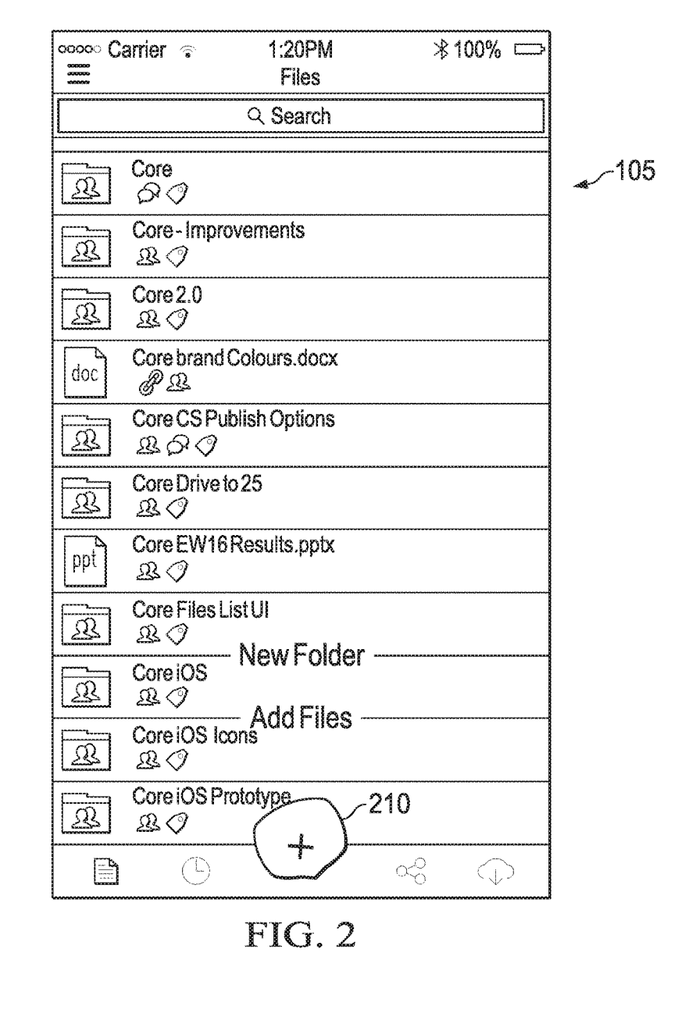
FIGS. 2-7 depict an example of an animated transitioning process in which the selectable object of FIG. 1 is transitioned to a dialog menu according to some embodiments.

FIG. 2 depicts a display of a user interface showing the selectable object of FIG. 1 in a first display of a sequence of an animated transition of the selectable object to a dialog menu according to some embodiments.

In the example shown in FIG. 2, the display 105 may display the selectable object 110 in an animated transitioning, as object 210, to a dialog menu. In the example shown in FIG. 2, the animated transitioning may include rotating a part of the selectable object (e.g., the "Add" or "+" symbol), as well as transitioning the shape of the selectable object. As discussed below, the rotating part of the selectable object shown in FIG. 2 eventually transitions to a selectable icon in the dialog menu (see FIG. 7). As also shown in FIG. 2, in one embodiment, as soon as the animated transitioning process begins, dialog menu items (e.g., "New Folder," "Add Files," etc.) can be displayed on the display 105 along with the selectable object. In some embodiments, such dialog menu items can be displayed inside or outside the animated transitioning object 210. In some embodiments, such dialog menu items can be at a later transitioning stage (e.g., FIG. 4, FIG. 5, or FIG. 6) after the start of the animated transitioning process. In the example shown in FIG. 2, the animated transitioning process may be triggered by a selection event (e.g., by receiving a click event resulting from a device user selection of the selectable object 110.

Figure 3:
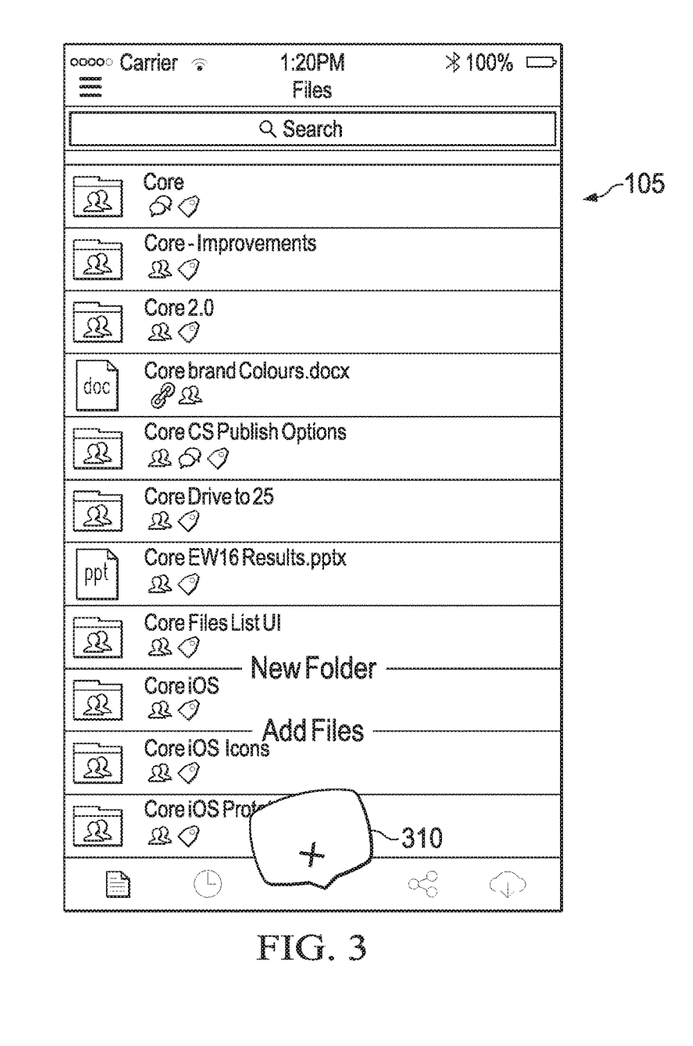

FIG. 3 depicts a display of a user interface showing the selectable object of FIG. 1 in a second display of the sequence of the animated transition of the selectable object to the dialog menu according to some embodiments.

In the example shown in FIG. 3, the display 105 may display the selectable object 110 continuing the animated transitioning—this time from object 210 to object 310. In the example shown in FIG. 3, the animated transitioning may include continued rotation of the "Add" or "+" symbol, as well as continued transitioning of the shape of the selectable object. In the example of FIG. 3, dialog menu items (e.g., "New Folder," "Add Files," etc.) are displayed in the display 105 at the same position and have the same size as shown in FIG. 2. In some embodiments, such dialog menu items may themselves transition in position and/or size from stage to stage. For example, initially, at the start of the animated transitioning process, the dialog menu items may be sized to fit inside the animated transitioning object 210. As the shape of the animated transitioning object changes (e.g., enlarges) from one stage to another (e.g., from FIG. 2 to FIG. 3), the position and size of the dialog menu items may also change accordingly.

Figure 4:
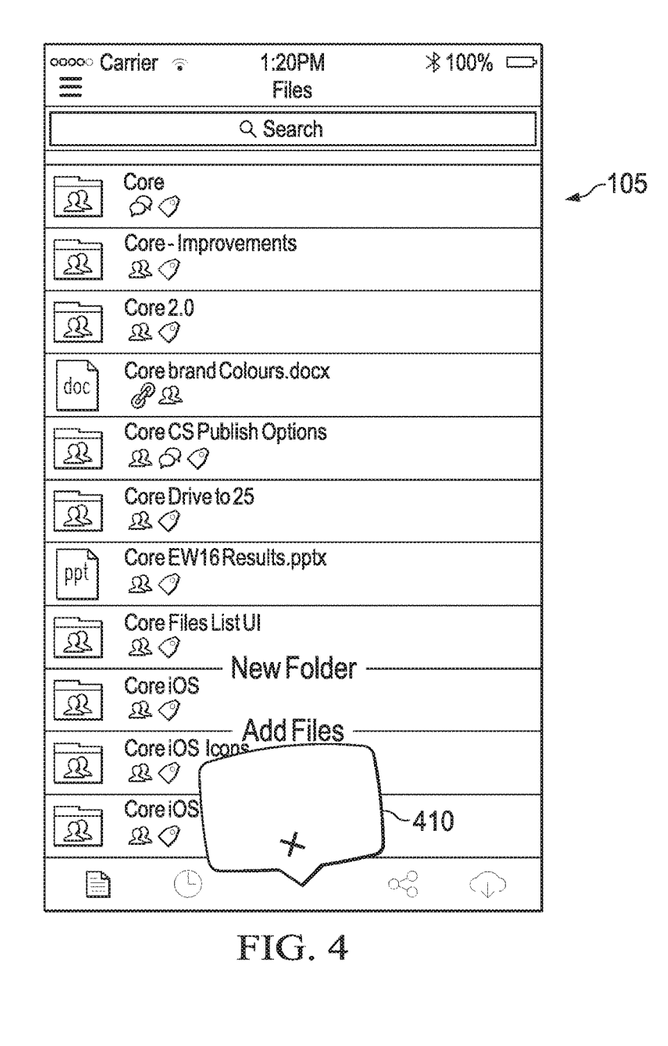

FIG. 4 depicts a display of a user interface showing the selectable object of FIG. 1 in a third display of the sequence of the animated transition of the selectable object to the dialog menu according to some embodiments.

In the example shown in FIG. 4, the display 105 may display the selectable object 110 continuing the animated transitioning—this time from object 310 to object 410. In the example shown in FIG. 4, the animated transitioning may include continued rotation of the "Add" or "+" symbol, as well as continued transitioning of the shape of the selectable object.

Figure 5:
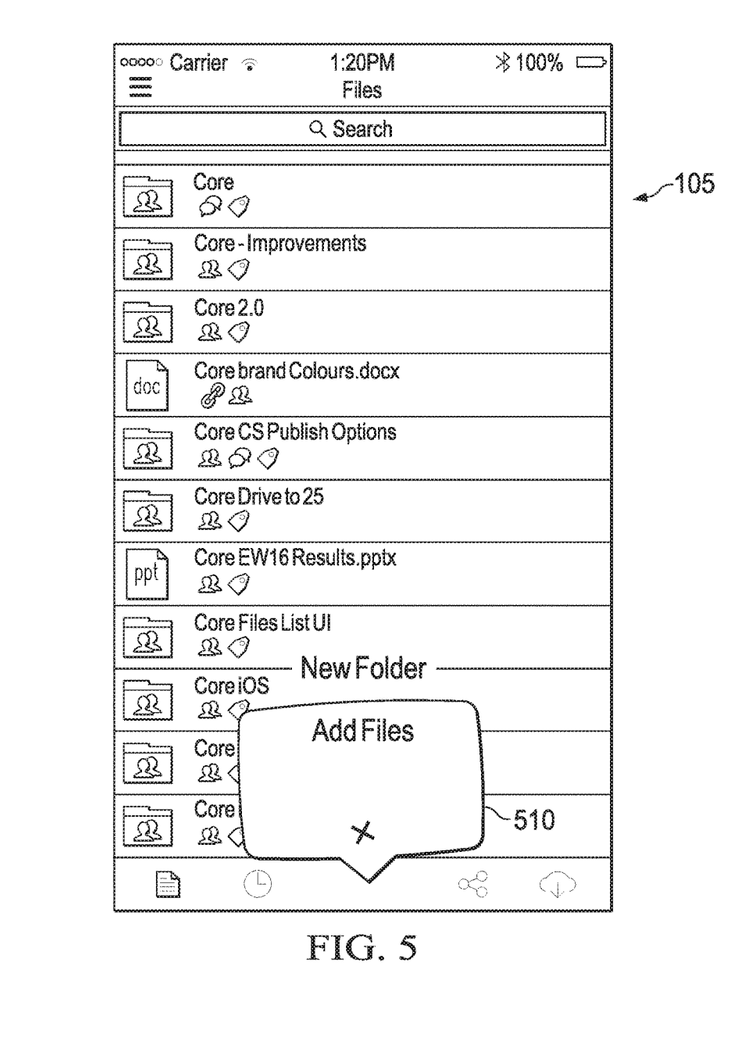

FIG. 5 depicts a display of a user interface showing the selectable object of FIG. 1 in a fourth display of the sequence of the animated transition of the selectable object to the dialog menu according to some embodiments.

In the example shown in FIG. 5, the display 105 may display the selectable object 110 continuing the animated transitioning—this time from object 410 to object 510. In the example shown in FIG. 5, the animated transitioning may include continued rotation of the "Add" or "+" symbol, as well as continued transitioning of the shape of the selectable object.

Figure 6:
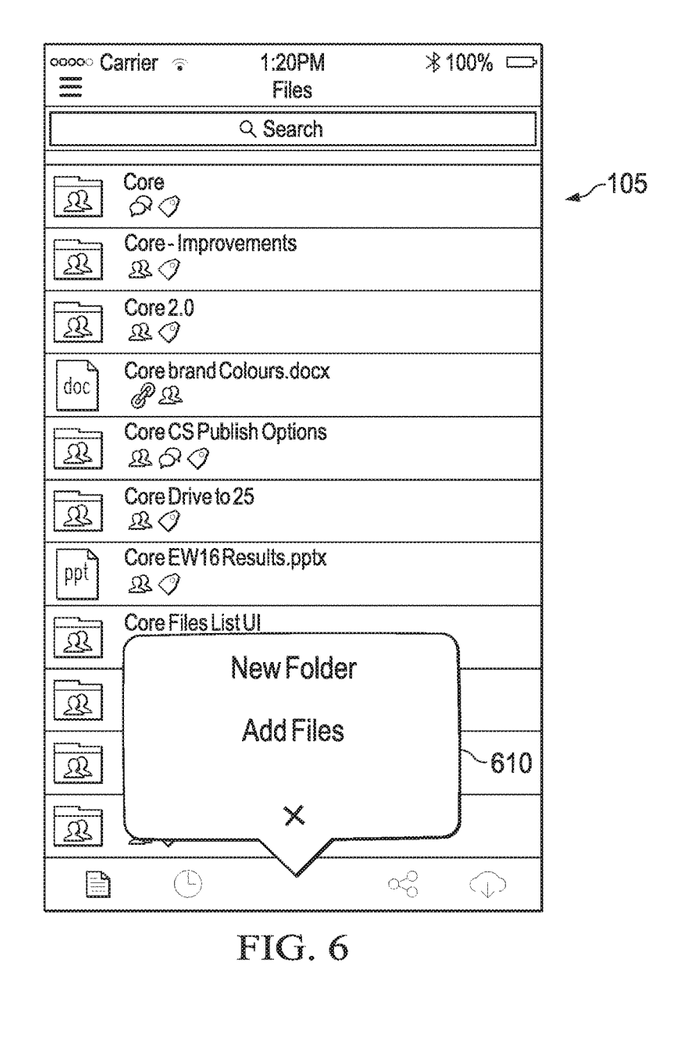

FIG. 6 depicts a display of a user interface showing the selectable object of FIG. 1 in a fifth display of the sequence of the animated transition of the selectable object to the dialog menu according to some embodiments.

In the example shown in FIG. 6, the display 105 may display the selectable object 110 continuing the animated transitioning—this time from object 510 to object 610. In the example shown in FIG. 5, the animated transitioning may include continued rotation of the "Add" or "+" symbol, as well as continued transitioning of the shape of the selectable object. At this stage, it can be seen that the animated transitioning from the "+" symbol (which represents an "Add" function of the dialog menu) to a "x" symbol (which represents a "Cancel" or "Close" function of the dialog menu) is almost complete.

Figure 7:
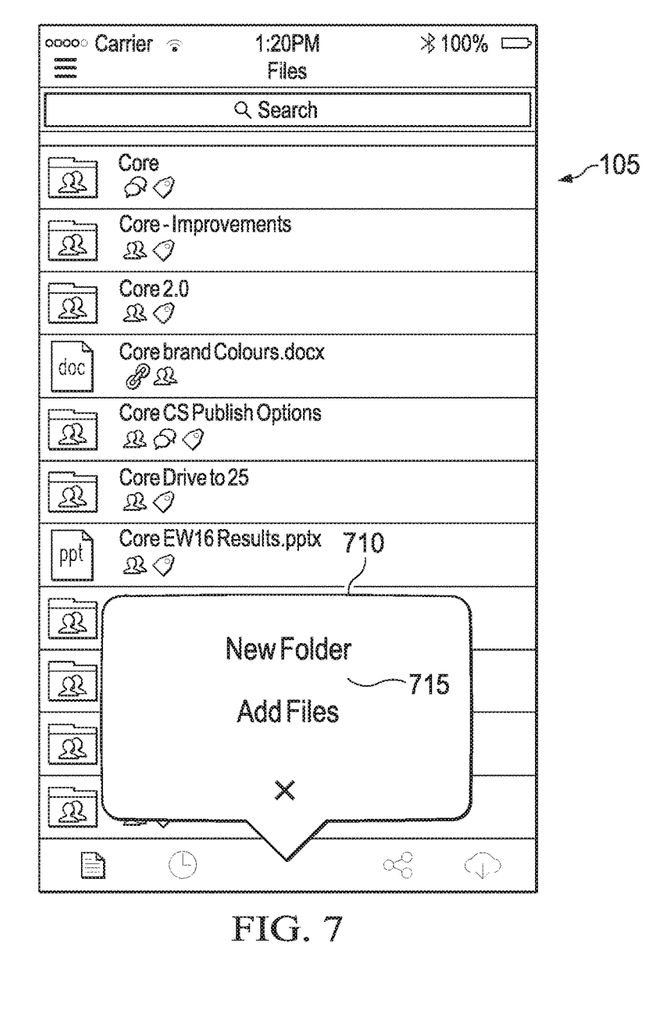

FIG. 7 depicts a display of a user interface showing the selectable object of FIG. 1 in a sixth display that depicts the dialog menu with a selectable icon resulting from the sequence of the animated transition of the selectable object to the dialog menu according to some embodiments.

In the example shown in FIG. 7, the display 105 may display a dialog menu 710 that has been transitioned from the selectable object 110 of FIG. 1. At this stage, the animated transitioning process from a selectable object to a dialog menu is complete and the dialog menu items of the dialog menu 710 are displayed within the dialog menu 710 as selectable options 715. In the example shown in FIG. 7, the rotating part of the selectable object 110 (e.g., the "Add" or "x" symbol) has transitioned into a selectable icon or symbol (e.g., a "Close" or "x" symbol) in the center of the bottom of the dialog menu. Likewise, in the example shown in FIG. 7, the shape of the selectable object 110 has transitioned from a circle into a dialog window.

At this time, the user can interact with the dialog menu 710 through the selectable options 715 (e.g., create a new folder, add a new file, etc.). The user can also close or cancel the dialog menu 710 by selecting the selectable icon or symbol "x" in the dialog menu 710. Upon selection of the selectable icon or symbol "x" in the dialog menu 710, another animated transitioning process is invoked to transition the dialog menu 710 back to the selectable object 110. This process is illustrated in FIGS. 8-10.

Figure 8:
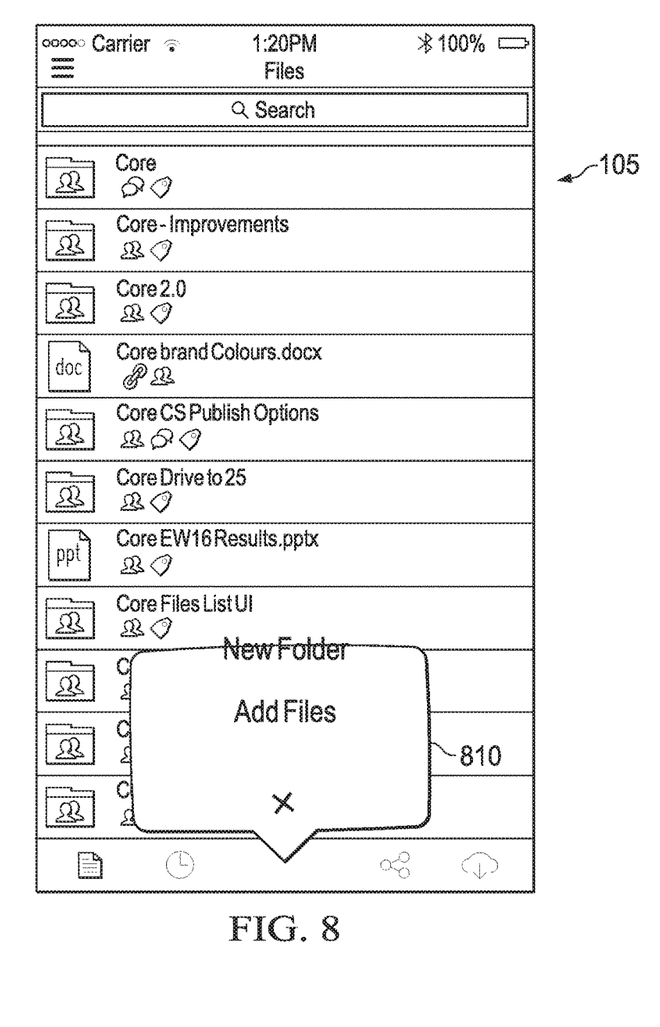
FIGS. 8-10 depict an example of an animated transitioning process in which the dialog menu of FIG. 7 is transitioned to a selectable object according to some embodiments.

As shown in FIG. 8, the size and shape of the dialog menu 710 of FIG. 7 are changing, transitioning to an animated transitioning object 810. Meanwhile, the selectable icon (e.g., the "Close" or "x" symbol) in the dialog menu 710 begins to rotate. Although the dialog menu items are shown in FIG. 8, in one embodiment, they may disappear once the animated transitioning process is triggered to transition the dialog menu 710 to a selectable object. In one embodiment, the dialog menu items may change in position and/or size relative to the shape and/or size of the animated transitioning object 810.

Figure 9:
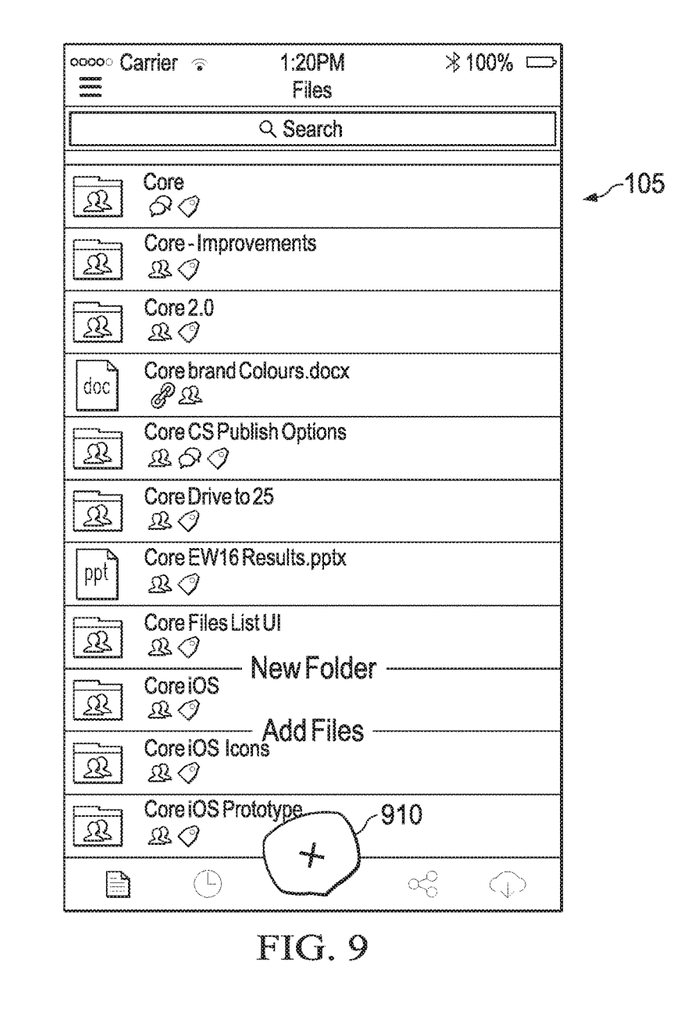

In the example shown in FIG. 9, the display 105 may display the dialog menu 710 continuing the animated transitioning—this time from object 810 to object 910. Again, the animated transitioning process includes rotating a part of the animated transitioning object (e.g., rotating the selectable icon from "x" to "+"), as well as changing the size and shape of the overall animated transitioning object. Although the dialog menu items are shown in FIG. 9 as having the same size and position throughout the animated transitioning, in one embodiment, the dialog menu items may change in position and/or size relative to the shape and/or size of the animated transitioning object 910.

Figure 10:
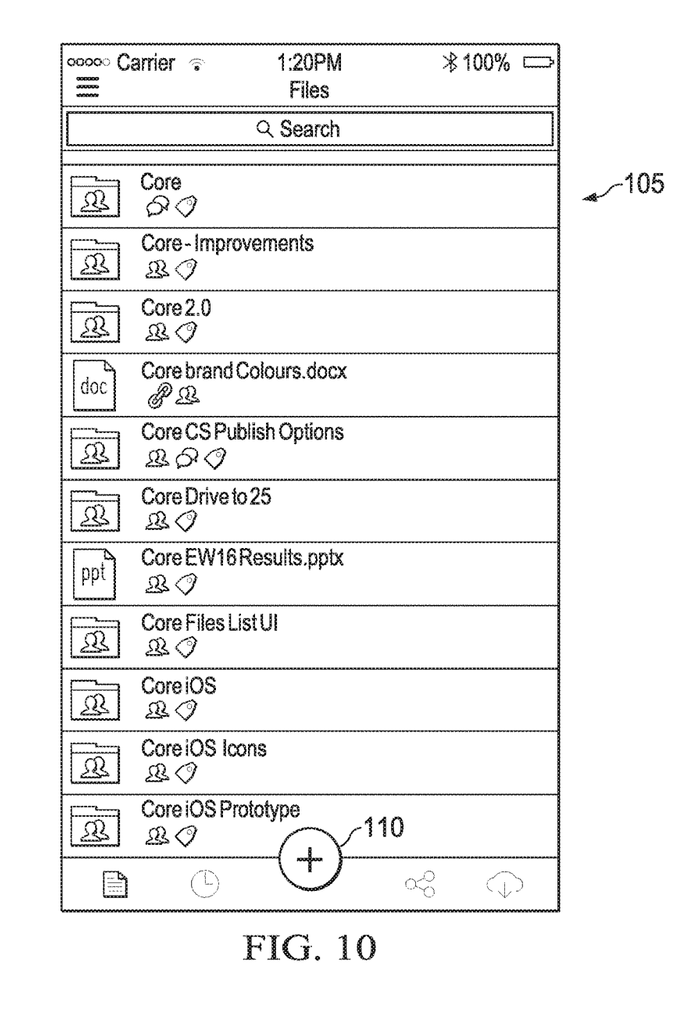

FIG. 10 depicts a display of a user interface showing a selectable object 110 (see FIG. 1) that has been transitioned from the dialog menu 710 of FIG. 7. At this stage, the animated transitioning process from a dialog menu to a selectable object is complete. Anytime the user wishes to access the dialog menu again, the user can select the selectable object 110 which triggers the animated transitioning process described above with reference to FIGS. 2-7. Whenever the user is done with the dialog menu, the user can close the dialog menu which triggers the animated transitioning process described above with reference to FIGS. 8-10. While either the selectable object (see FIG. 1 or FIG. 10) or the dialog menu (see FIG. 7) can be displayed in the display 105 for as long as the user wishes, the animated transitioning process (from a selectable object to a dialog menu or from a dialog menu to a selectable object) can take only a second or a fraction of a second.

Conventionally, a computer-generated user interface (UI) such as a menu may provide a dialog box that pops up on top of a currently visible screen. However, such a dialog box may not be very convenient, may consume substantial space on a display, and may not be aesthetically pleasing to the eye of a user. Further, different platforms (e.g., IOS, ANDROID, etc.) may provide the user with different user interfaces (e.g., menus), which may be confusing and/or inconvenient to a device user as they navigate using different devices. In accordance with example techniques discussed herein, reusing an "Add" symbol (e.g., a "+" symbol) to also be a "Close" symbol (e.g., an "x" symbol) to close the dialog can save a lot of unnecessarily wasted space on a UI.

For example, a user interaction may trigger a transform of a button that the user initially clicked on into a dialog box. For example, if a button is used to "Add File" or "Add Folder" it may also take a "+" symbol from the transformed button and re-use it as an action to close the dialog by rotating the "+" symbol to be an "x" symbol. In this way, a UI on a device may provide a seamless transition from a click of a button to a dialog menu of choices.

As another example, a UI on a device may provide uniformly-placed objects, across different platforms and/or different devices. Previously, a first device native platform may place buttons in the top of a display, while a second device native platform may place buttons on the left or right side of the display. This arrangement may not only make the UI experience confusing for the user, but may also interfere with the readability of other items on the display of the device. In some embodiments, a selectable button may be placed at the bottom of a display, consistently across various platforms of different devices.

In some embodiments, application development users may generate user interfaces such as dialog menus disclosed herein using Application Development Tools. For example, techniques discussed herein may be implemented using native IOS xcode, an ANDROID native environment, JavaScript libraries, etc.

Example techniques discussed herein may be used for transitioning from one function in a UI (e.g., via a displayed selectable button) to another function in the UI (e.g., via a displayed menu dialog). Additionally, example techniques discussed herein may be used for transitioning from a selectable button in a UI to a display of a full page menu dialog. For example, the transitioning may be performed through an animated transition, following a selection event (e.g., a user selection of a selectable button, click event, hover, touch, etc.).

Figure 11:
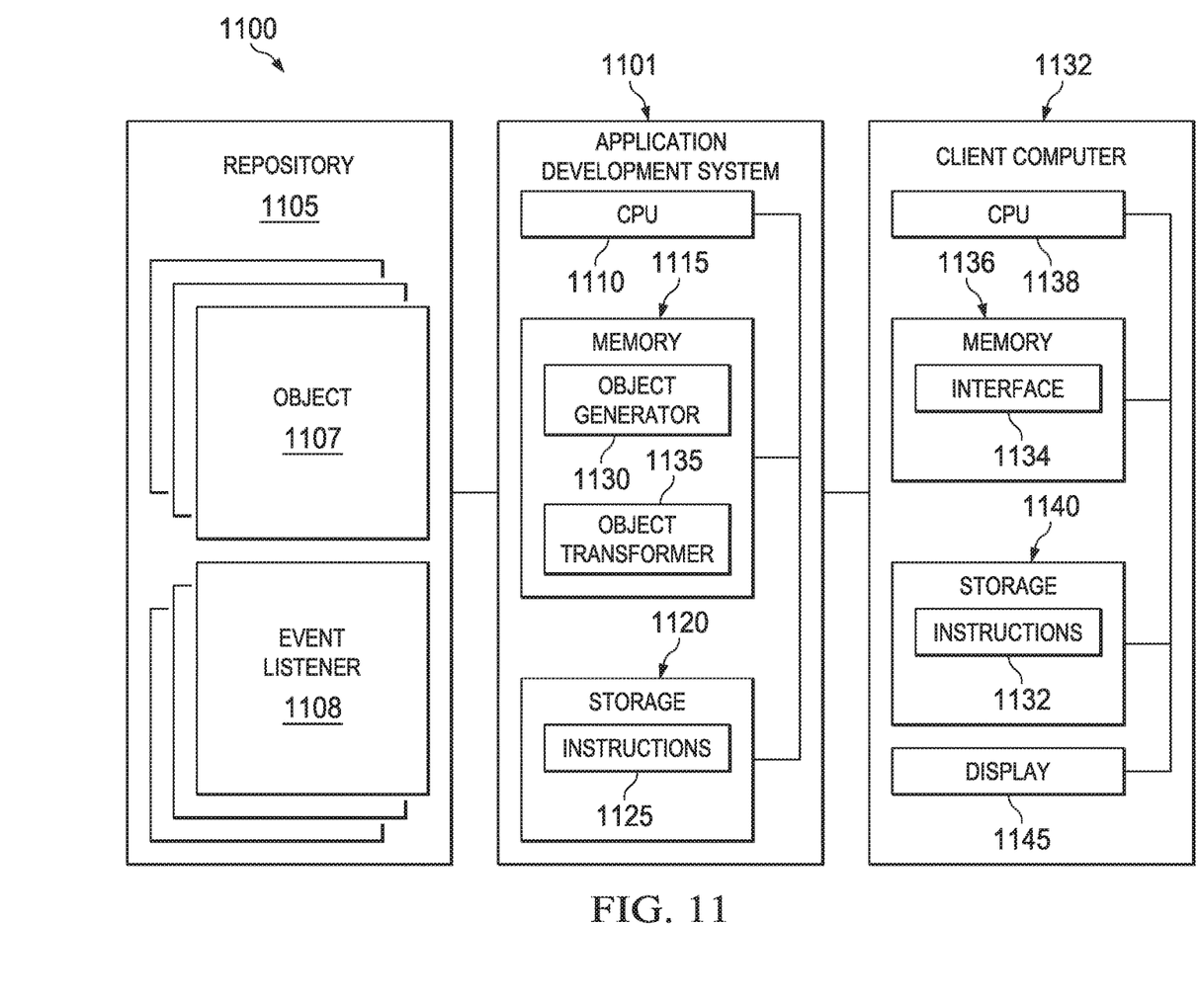
FIG. 11 depicts a block diagram illustrating one embodiment of a computing environment with an application development system according to some embodiments.

FIG. 11 depicts a block diagram illustrating one embodiment of a computing environment 1100 with application development system 1101. Computing environment 1100 includes an object repository 1105 storing objects 1107 (e.g., shapes, user-actionable user interface elements, applications, user interfaces, etc., see e.g., selectable object 110 shown in FIGS. 1 and 10) and event listeners 1108 generated by a user of application development system 1101 (e.g., application developer, etc.). Object repository 1105 may comprise a file server or other storage mechanism remotely or locally accessible by application development system 1101.

In the embodiment of FIG. 11, application development system 1101 comprises a computing device having a central processing unit 1110 connected to a memory 1115 and storage unit 1120 via a bus. Central processing unit 1110 may represent a single processor, multiple processors, a processor(s) with multiple processing cores and the like. Storage unit 1120 may include a non-transitory storage medium such as hard-disk drives, flash memory devices, optical media and the like. Application development system 1101 may be connected to a data communications network (not shown).

Storage unit 1120 stores computer executable instructions 1125. Computer executable instructions 1125 can represent multiple programs and operating system code. In one embodiment, instructions 1125 are executable to provide an object generator 1130 and object transformer 1135. Object generator 1130 and object transformer 1135 may be portions of the same program or may be separate programs. According to one embodiment, for example, object generator 1130 and object transformer 1135 are components of a document management system. According to one embodiment, for example, object generator 1130 and object transformer 1135 are components of an application development system. Furthermore, object generator 1130 and object transformer 1135 can be implemented on different computing systems and can, themselves, be distributed.

Client computer system 1132 may include components similar to those of the application development system 1101, such as CPU 1138, memory 1136, and storage 1140. Additionally, client computer system 1132 may include executable instructions 1132 to provide a user interface 1134 that allows a user of client computer system 1132 to interact with elements on a display 1145. The user interface 1134 may be provided through a web browser, file system interface or other program.

The application development system 1101 of FIG. 11 is merely an example of a computing system and embodiments of an application development system that may be implemented using other computing systems (e.g., desktop computers, laptops, mobile computing devices or other computing devices with adequate processing and memory) including multiple computers acting together to provide an application development system (e.g., a cluster of servers or other computing devices connected by a network acting together to provide the application development system). Similarly, client computer system 1132 may include any suitable desktop computer, laptop, mobile device, server, or other computing system.

In operation, object generator 1130 may create the objects 1107 in object repository 1105. Object transformer 135 may configure a first object to be transformable to a second object. For example, object transformer 135 may configure the first object (e.g., embodying a first function) to be transformable, via a user interaction, to the second object (e.g., embodying a second function). For example, object transformer 135 may configure the transformation to be an animated transformation of the first object to the second object. For example, object transformer 135 may configure the transformation to reuse a graphical symbol of the first objet in the transformed second object.

Figure 12:
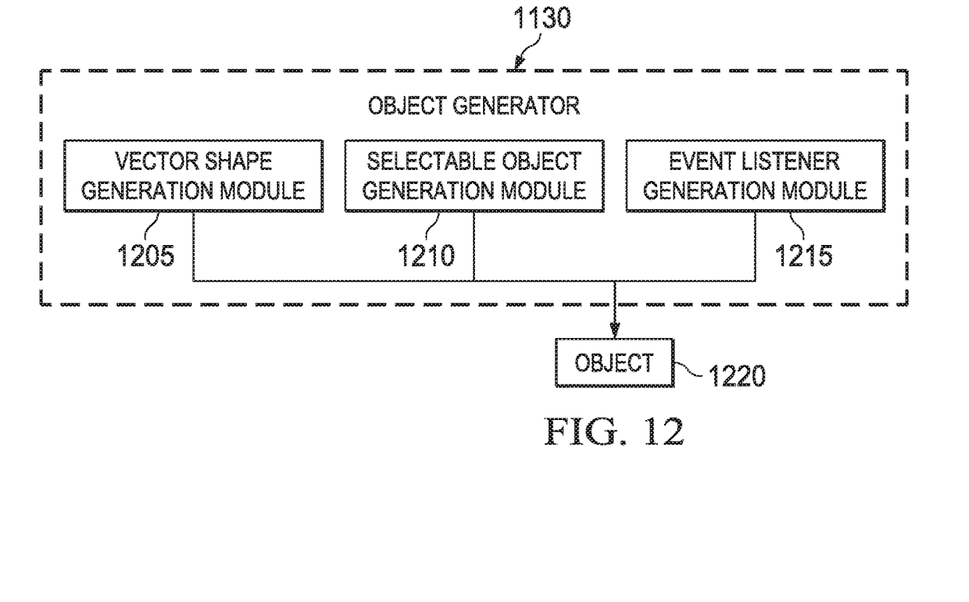
FIG. 12 depicts a diagrammatic representation of an example object generator according to some embodiments.

FIG. 12 depicts a diagrammatic representation of one embodiment of an object generator 1130 for generating an object 1220. Object generator 1130 can comprise various modules to process an object 1107. For example, a vector shape generation module 1205 may generate a vector shape (e.g., based on user input, etc.). For example, a selectable object generation module 1210 may generate a selectable object using the vector shape (e.g., based on user input, etc.). For example, an event listener generation module 1215 may generate one or more event listeners on the selectable object. For example, object generation instructions may utilize UI functions of software development toolkits (SDKs) of various platforms (e.g., iOS, ANDROID, etc.).

Figure 13:
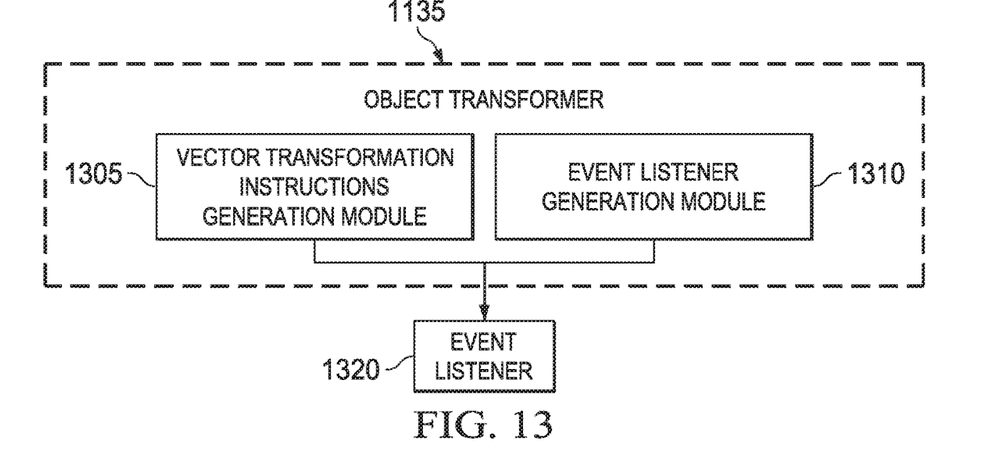
FIG. 13 depicts a diagrammatic representation of an example object transformer according to some embodiments.

FIG. 13 depicts a diagrammatic representation of one embodiment of an object transformer 1135 for configuring an event listener 1108 to transform an object 1220. Object transformer 1135 can comprise various modules to process an object 1220. For example, a vector transformation instructions generation module 1305 may generate instructions for transforming the object 1220 (e.g., based on user input, etc.) from a first object to a second object. For example, vector transformation instructions may utilize UI functions of SDKs of various platforms (e.g., iOS, ANDROID, etc.). Further, an event listener generation module 1310 may generate one or more event listeners on the second object.

The embodiments of FIGS. 12 and 13 are provided by way of example. Object generator 1130 may include any number of other modules to generate an object, and object transformer 1135 may include any number of other modules to transform an object. Object generator 1130 and/or object transformer 1135 may be portions of a larger program, such as a document management program, may be separate programs or may be implemented according any suitable programming architecture. In one embodiment, the process of generating objects and/or transforming the objects may be carried out by any number of different programs on a computer system or distributed across computer systems.

For example, in an Application Development Tool, or any type of shape generation application (e.g., ANDROID, POWERPOINT, VISIO, etc.), an application development user may use a shape tool to request creation of a circle. One skilled in the art of computing will appreciate that there are many other ways to obtain shapes, for example, by importing shapes that have been previously created. The application development user may then make it a circle symbol. For example, the circle symbol may be generated as a vector shape (e.g., a circle shape) symbol, and a text tool may be used to add an "Add" symbol (e.g., as "+" text) on top of it. In this context, a "vector shape" refers to a shape having editable properties. For example, vector graphics uses polygons to represent images in computer graphics. Vector graphics are based on vectors, which lead through locations called control points or nodes. Each of these points has a definite position on the x- and y-axes of the work plane and determines the direction of the path; further, each path may be assigned various attributes, including such values as stroke color, shape, curve, thickness, and fill.

The application development user may then select both shapes (circle and plus symbol), right click on the selected shapes, and request the system to group them as one object (e.g., a button). The application development user may then request the system to generate a button object (e.g., named "circle" or "button") using the grouped shapes. One skilled in the art of computing will understand that many different platforms (e.g., APPLE IOS, ANDROID, etc.) provide support for generation of buttons. For example, the shapes and buttons may be generated in an application development environment.

The application development user may then request the system to create a click event listener on the shape symbol to be used for opening the dialog menu (e.g., a button object, shape/symbol, circle, etc.). One skilled in the art of computing will understand that click events are available for implementation on many different platforms (e.g., APPLE IOS, ANDROID, etc.).

At this time, the click event listener is empty (e.g., an empty container that acknowledges a user action, e.g., hover or click with respect to the button object). At this point, the click event listener is ready for an action to be performed, upon a click event (e.g., a transformation, e.g., open a dialog, trigger an animation).

In this context, an "event" refers an action or occurrence recognized by a computing device that may be handled by the computing device (e.g., via software). Generally, computing device events can be generated or triggered by the system, by the user or in other ways.

In this context, an "event listener" is a detection mechanism which, once set to an object, waits for some action to be performed on the object (e.g., mouse click, mouse hover, pressing of keys, click of button, etc.).

In accordance with an example technique, on the click event listener, the application development user may write custom vector transformation instructions (e.g., code) to be associated with the click event listener in the system. For example, the application development user may write the custom vector transformation code using an integrated development environment (IDE). For example, the application development user may use a vector transformation to achieve a desired shape for the dialog. For example, a vector transformation may provide an ability to manipulate shapes in code, available in many coding platforms (e.g., transform a square into a circle, a circle into a rectangle, etc.).

As an example, an application development user may write coordinates and object names, using sample code such as (circle.addeventlistener[mouseclick]: functionname: do_transformation (A, B)), providing information for the shape_at_starting and the shape_at_stopping.

Thus, the vector transformation may be provided a first set of coordinates for shape A at a starting position, and a second set of coordinates for shape B at a finish position, and the vector transformation may handle the animated movement of starting shape A to finished shape B.

Thus, if a user of a UI selects (e.g., by a mouse click) the circle (e.g., a button), the UI may detect a triggering event and may display a transformation (e.g., via an animation on the dialog menu) from a first shape A to a second shape B (e.g., transforming from a circle shape to a rectangle shape). For example, the second shape B may include a dialog shape. For example, the transformation may include transforming from a selectable button to the dialog. For example, this may provide a technical effect of transforming a first UI element to a completely different UI element, in a seamless, space-conservative manner. For example, this may also provide a technical effect of transforming a first UI element representing a first function to a completely different UI element representing a second function, in a seamless, user-friendly, space-conservative manner. For example, this may also provide a technical effect of providing an interactive UI that provides consistent placement of the first and second UI elements across platforms.

The application development user may further provide code to enable the dialog menu, while the shape is transforming from the circle to the dialog shape, to also transform the "Add" symbol (e.g., a "+" symbol) to a "Close" symbol (e.g., an "x" symbol) by animating a rotation property of the "+" symbol to a desired position, similarly to the transformation discussed above.

In some implementations, a vector transformation may be used on the click event to achieve a desired shape for the dialog. For example, a vector transformation may utilize a set of coordinate values to generate a shape (e.g., square, circle, triangle, custom shape, etc.).

Further, while the shape is transforming from a circle to a dialog (e.g., in a display, during execution), the "+" symbol may be transformed to an "x" symbol by animating a rotation property for the "+" symbol to a desired position. For example, the "+" symbol may be rotated by a slight angle to transform from the "+" symbol to an "x" symbol.

When the dialog is displayed, available dialog choices may be displayed (e.g., create new file, create new folder, open camera, etc.). For example, event listeners may be added to new buttons in the dialog.

The application development user may further provide code for the system to remove the event listener (e.g., calling objectname.removeeventlistener), or to turn on an "add event listener" functionality (e.g., turn an objectname.addeventlistener back on). For example, the initial click event listener that had been placed on the shape/symbol to open the dialog (e.g., custom dialog) may be removed.

For example, the application development user may further provide instructions for the system to add a new event listener to the "x" symbol to handle closing the dialog For example, when the dialog appears (e.g., in a display), the code may provide functionality to show the dialog menu choices (items). For example, the dialog menu choices may include a "create items" selection (e.g., create a new folder and add files) and may provide a menu with user options on where to place them.

For example, the application development user may request the system to add event listeners to new buttons in the dialog. For example, the new buttons may be customized to add files, or to add a new folder.

For example, the application development user may, for some or all of the dialog button listeners and the close button, provide code to request the system to reverse the vector transformation to return the dialog back to the first shape object (e.g., a circle, or button), and re-add the original click event listener on the shape/symbol to open the dialog.

For example, the application development user may save the code as it is written. In some implementations, processes may be saved as an xcode project as the application development user proceeds in development.

In some embodiments, an example circle shape may be generated as shown in the following sample code segment:

```
CIRCLE
  makeCircle( ) {
  /* ... */
  shape-inside: polygon(250px 0, 350px 170px, 500px 180px, 380px 320px, 450px 500px, 250px 420px, 50px 500px, 120px 320px, 0px 180px, 150px 170px );
  shape-padding: 10px;
  transition: all 3s ease;
  -webkit-clip-path: polygon(250px 0, 350px 170px, 500px 180px, 380px 320px, 450px 500px, 250px 420px, 50px 500px, 120px 320px, 0px 180px, 150px 170px );
  }
```

As shown in the example segment above, the code includes a set of coordinate and position values for generating the circle.

In some embodiments, an example, a star shape may be generated as shown in the following sample code segment:

```
STAR
  makeStar( ) {
  shape-inside: polygon(250px 0, 500px 0, 500px 180px, 500px 320px, 500px 500px, 250px 500px, 0 500px, 0 320px, 0 180px, 0 0);
  -webkit-clip-path: polygon(250px 0, 500px 0, 500px 180px, 500px 320px, 500px 500px, 250px 500px, 0 500px, 0 320px, 0 180px, 0 0);
  }
```

As shown in the example segment above, the code includes a set of coordinate and position values for generating the star.

For example, an application development user may create custom code similarly for requesting the system to generate a dialog.

Example techniques discussed herein may be implemented using code that an application development user may compile and/or simulate using various operating systems (OSs) and/or platforms. For example, by using the example techniques discussed herein, an end user of devices may be provided a more consistent user experience across various platforms, on different computing devices.

For example, as a result of the developed UI, a device user of the UI may be provided a display of a first selectable object (e.g., an "Add" icon, a button with a "+") on a user device (e.g., mobile device, desktop, etc.), which the user may select (e.g., via a touch, mouse click, hover, etc.). When the first selectable object is selected, the user device may display a transformation (e.g., an animated transformation) from the displayed first selectable object to a second object (e.g., a menu), while transforming a first displayed icon to a second displayed icon (e.g., transforming from a "+" in a circle to an "X" in a rectangle or full screen display). Further, when the first selectable object is selected, a first function (e.g., display of a selection to "Add," listen for associated events for the first function) may be transformed to a second function (e.g., display of a selection to "Close," listen for associated events for the second function). For example, a button may be visually transformed to a menu, as an animated transformation. Further, a first shape (e.g., "+" symbol in a circle) may be transformed to a second shape (e.g., "x" symbol in a rectangle), as an animated transformation.

Figure 14:
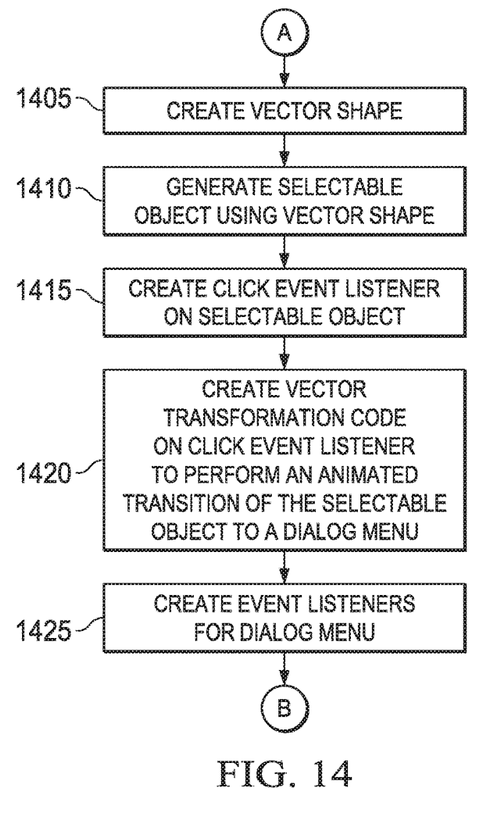
FIG. 14 depicts a flow chart illustrating an example of a method for generating an application to provide an animated computer-generated menu according to some embodiments.

FIG. 14 depicts a flow chart illustrating an example of a method for generating an application to provide an animated computer-generated menu according to some embodiments. In the example shown in FIG. 14, at 1405, a vector shape may be created. At 1410, a selectable object may be generated using a vector shape.

At 1415, a click event listener may be created on the selectable object to perform an animated transition of a selectable object to a dialog menu. At 1420, vector transformation code may be created on the click event listener. At 1425, one or more event listeners may be created for the dialog menu.

Figure 15:
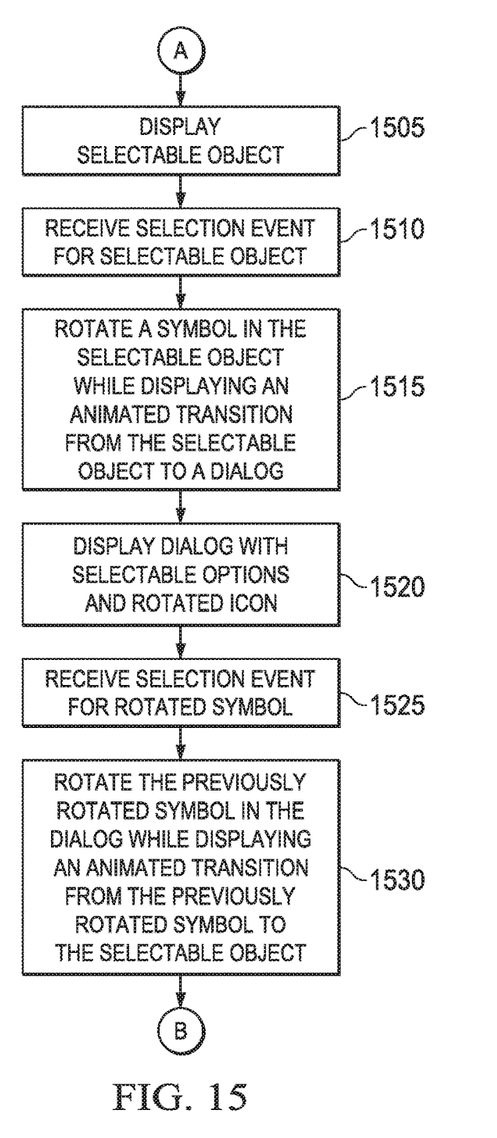
FIG. 15 depicts a flow chart illustrating an example of a method for providing an animated computer-generated menu according to some embodiments.

FIG. 15 depicts a flow chart illustrating an example of a method for providing an animated computer-generated menu according to some embodiments. In the example shown in FIG. 15, at 1505, a selectable object may be displayed. At 1510, a selection event may be received for the selectable object. For example, an event listener may detect a click event for the selectable object.

At 1515, a symbol in the selectable object may be rotated while displaying an animated transition from the selectable object to a dialog menu. At 1525, the resulting dialog menu may be displayed with selectable options and the resulting rotated symbol. At 1530, the previously rotated symbol in the dialog menu may be rotated while displaying an animated transition from the previously rotated symbol to the selectable object.

Figure 16:
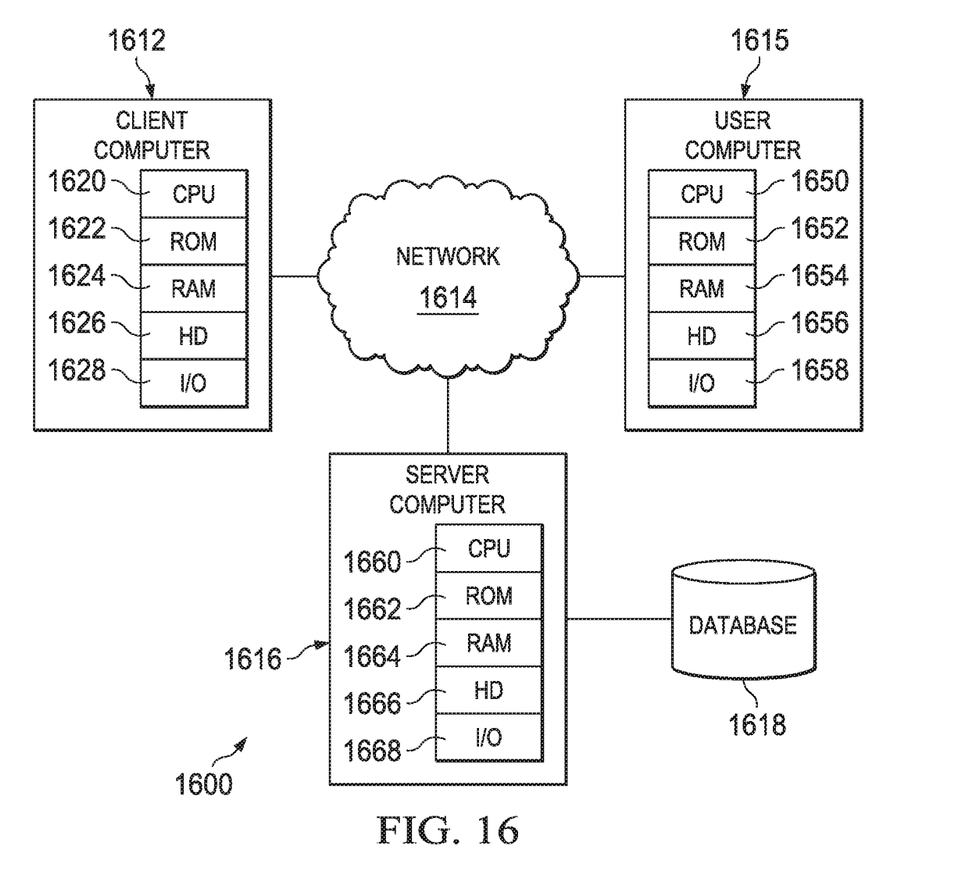
FIG. 16 depicts a diagrammatic representation of a distributed network computing environment where embodiments disclosed herein can be implemented.

FIG. 16 depicts a diagrammatic representation of a distributed network computing environment where embodiments disclosed can be implemented. In the example illustrated, network computing environment 1600 includes network 1614 that can be bi-directionally coupled to computer 1612, computer 1615, and computer 1616. Computer 1616 can be bi-directionally coupled to data store 1618. Network 1614 may represent a combination of wired and wireless networks that network computing environment 1600 may utilize for various types of network communications known to those skilled in the art.

For the purpose of illustration, a single system is shown for each of computer 1612, computer 1615, and computer 1616. However, with each of computer 1612, computer 1615, and computer 1616, a plurality of computers (not shown) may be interconnected to each other over network 1614. For example, a plurality of computers 1612 and a plurality of computers 1615 may be coupled to network 1614. Computers 1612 may include data processing systems for communicating with computer 1616. Computers 1615 may include data processing systems for individuals whose jobs may require them to configure services used by computers 1612 in network computing environment 1600.

First enterprise computer 1612 can include central processing unit ("CPU") 1620, read-only memory ("ROM") 1622, random access memory ("RAM") 1624, hard drive ("HD") or storage memory 1626, and input/output device(s) ("I/O") 1628. I/O 1629 can include a keyboard, monitor, printer, electronic pointing device (e.g., mouse, trackball, stylus, etc.), or the like. Computer 1612 can include a desktop computer, a laptop computer, a personal digital assistant, a cellular phone, or nearly any device capable of communicating over a network. Computer 1615 may be similar to computer 1612 and can comprise CPU 1650, ROM 1652, RAM 1654, HD 1656, and I/O 1658.

Likewise, computer 1616 may include CPU 1660, ROM 1662, RAM 1664, HD 1666, and I/O 1668. Computer 1616 may include one or more backend systems configured for providing a variety of services to computers 1612 over network 1614. These services may utilize data stored in data store 1618. Many other alternative configurations are possible and known to skilled artisans.

Each of the computers in FIG. 16 may have more than one CPU, ROM, RAM, HD, I/O, or other hardware components. For the sake of brevity, each computer is illustrated as having one of each of the hardware components, even if more than one is used. Each of computers 1612, 1615, and 1616 is an example of a data processing system. ROM 1622, 1652, and 1662; RAM 1624, 1654, and 1664; HD 1626, 1656, and 1666; and data store 1618 can include media that can be read by CPU 1620, 1650, or 1660. Therefore, these types of memories include non-transitory computer-readable storage media. These memories may be internal or external to computers 1612, 1615, or 1616.

Portions of the methods described herein may be implemented in suitable software code that may reside within ROM 1622, 1652, or 1662; RAM 1624, 1654, or 1664; or HD 1626, 1656, or 1666. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

What is claimed is:

1. A system, comprising:
   a device processor;
   a non-transitory computer readable medium; and
   stored instructions translatable by the processor to perform:
      creating a vector shape having a control point on a plane and a direction of a path per the control point;

generating a selectable object using the vector shape, wherein the selectable object has a graphical outline defining a size and shape of the selectable object;

creating an event listener for the selectable object; and creating vector transformation instructions on the event listener, wherein the vector transformation instructions, when executed on a user device include:

programmatically transform the selectable object from one function to another function in a user interface, wherein programmatic transformation of the selectable object is triggered by a selection event detected by the event listener on the selectable object displayed on the user device;

displaying on the user device an animated transition which shows that the graphical outline of the selectable object gradually increases in size and changes in shape to form a new dialog menu having dialog menu items representing different functions of the new dialog menu;

during a first stage of the animated transition, displaying on the user device the dialog menu items of the new dialog menu outside of the graphical outline of the selectable object; and during a second stage of the animated transition, the graphical outline of the selectable object increases in size sufficiently to allow the dialog menu items to be displayed in the new dialog menu within the graphical outline of the selectable object.

2. The system of claim 1, wherein the stored instructions are further translatable by the processor to perform:

creating the vector shape as a button shape with a first symbol within the button shape.

3. The system of claim 2, wherein the button shape comprises a circle shape and the symbol comprises a "+" shape.

4. The system of claim 2, wherein the animated transition of the selectable object to the new dialog menu comprises:

rotating the first symbol within the button shape into a second symbol within the new dialog menu; and changing size and shape of the selectable object to size and shape of the new dialog menu.

5. The system of claim 2, wherein the animated transition of the selectable object to the new dialog menu comprises:

changing a first function associated with the first symbol to a second function associated with the second symbol; and displaying the dialog menu items along or within the new dialog menu.

6. The system of claim 1, wherein the stored instructions are further translatable by the processor to perform:

creating a vector shape for the new dialog menu with a symbol placed within the new dialog menu;

creating a second event listener for the new dialog menu; and creating vector transformation instructions on the second event listener, the vector transformation instructions on the second event listener, when executed on the user device, performing an animated transition of the new dialog menu to the selectable object responsive to a second selection event detected by the second event listener on the new dialog menu displayed on the user device.

7. The system of claim 6, wherein the symbol comprises an "x" shape.

8. A method for animating a computer-generated dialog, comprising:

creating a vector shape having a control point on a plane and a direction of a path per the control point, the vector shape created by an object generator running on an application development system;

generating a selectable object, the selectable object generated by the object generator using the vector shape, wherein the selectable object has a graphical outline defining a size and shape of the selectable object;

creating, by the object generator, an event listener for the selectable object; and creating, by an object transformer running on the application development system, vector transformation instructions on the event listener, wherein the vector transformation instructions include:

when executed on a user device, programmatically transform the selectable object from one function to another function in a user interface, wherein programmatic transformation of the selectable object is triggered by follows a selection event detected by the event listener on the selectable object displayed on the user device;

displaying on the user device an animated transition which shows that the graphical outline of the selectable object gradually increases in size and changes in shape to form a new dialog menu having dialog menu items representing different functions of the new dialog menu;

during a first stage of the animated transition, display the dialog menu items of the new dialog menu outside of the graphical outline of the selectable object; and during a second stage of the animated transition, the graphical outline of the selectable object increases in size sufficiently to allow the dialog menu items to be displayed in the new dialog menu within the graphical outline.

9. The method according to claim 8, further comprising:

creating the vector shape as a button shape with a first symbol within the button shape.

10. The method according to claim 9, wherein the button shape comprises a circle shape and the symbol comprises a "+" shape.

11. The method according to claim 9, wherein the animated transition of the selectable object to the new dialog menu comprises:

rotating the first symbol within the button shape into a second symbol within the new dialog menu; and changing size and shape of the selectable object to size and shape of the new dialog menu.

12. The method according to claim 9, wherein the animated transition of the selectable object to the new dialog menu comprises:

changing a first function associated with the first symbol to a second function associated with the second symbol; and displaying the dialog menu items along or within the new dialog menu.

13. The method according to claim 8, further comprising:

creating a vector shape for the new dialog menu with a symbol placed within the new dialog menu;

creating a second event listener for the new dialog menu; and creating vector transformation instructions on the second event listener, the vector transformation instructions on the second event listener, when executed on the user device, performing an animated transition of the new dialog menu to the selectable object responsive to a second selection event detected by the second event listener on the new dialog menu displayed on the user device.

14. The method according to claim 13, wherein the symbol comprises an "x" shape.

15. A computer program product comprising a non-transitory computer readable medium storing instructions translatable by the processor to perform:
creating a vector shape having a control point on a plane and a direction of a path per the control point;
generating a selectable object using the vector shape, wherein the selectable object has a graphical outline defining a size and shape of the selectable object;
creating an event listener for the selectable object; and
creating vector transformation instructions on the event listener, wherein the vector transformation instructions, when executed on a user device include:
programmatically transform the selectable object from one function to another function in a user interface, wherein programmatic transformation of the selectable object is triggered by a selection event detected by the event listener on the selectable object displayed on the user device;
displaying on the user device an animated transition which shows that the graphical outline of the selectable object gradually increases in size and changes in shape to form a new dialog menu having dialog menu items representing different functions of the new dialog menu;
during a first stage of the animated transition, display the dialog menu items of the new dialog menu outside of the graphical outline of the selectable object; and
during a second stage of the animated transition, the graphical outline of the selectable object increases in size sufficiently to allow the dialog menu items to be displayed in the new dialog menu within the graphical outline of the selectable object.

16. The computer program product of claim 15, wherein the instructions are further translatable by the processor to perform:
creating the vector shape as a button shape with a first symbol within the button shape.

17. The computer program product of claim 16, wherein the button shape comprises a circle shape and the symbol comprises a "+" shape.

18. The computer program product of claim 16, wherein the animated transition of the selectable object to the new dialog menu comprises:
rotating the first symbol within the button shape into a second symbol within the new dialog menu; and
changing size and shape of the selectable object to size and shape of the new dialog menu.

19. The computer program product of claim 16, wherein the animated transition of the selectable object to the new dialog menu comprises:
changing a first function associated with the first symbol to a second function associated with the second symbol; and
displaying the dialog menu items along or within the new dialog menu.

20. The computer program product of claim 15, wherein the instructions are further translatable by the processor to perform:
creating a vector shape for the new dialog menu with a symbol placed within the new dialog menu;
creating a second event listener for the new dialog menu; and
creating vector transformation instructions on the second event listener, the vector transformation instructions on the second event listener, when executed on the user device, performing an animated transition of the new dialog menu to the selectable object responsive to a second selection event detected by the second event listener on the new dialog menu displayed on the user device.

* * * * *